United States Patent
Bartley et al.

(10) Patent No.: US 9,311,223 B2
(45) Date of Patent: Apr. 12, 2016

(54) PRIORITIZING TEST CASES USING MULTIPLE VARIABLES

(71) Applicant: International Business Machines Corporation, Armonk, NY (US)

(72) Inventors: Timothy S. Bartley, Worongary (AU); Gavin G. Bray, Robina (AU); Elizabeth M. Hughes, Australia Fair (AU); Kalvinder P. Singh, Miami (AU)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 13/898,537

(22) Filed: May 21, 2013

(65) Prior Publication Data

US 2014/0351793 A1 Nov. 27, 2014

(51) Int. Cl.
*G06F 9/44* (2006.01)
*G06F 11/36* (2006.01)

(52) U.S. Cl.
CPC ................................ *G06F 11/3676* (2013.01)

(58) Field of Classification Search
None
See application file for complete search history.

(56) References Cited

U.S. PATENT DOCUMENTS

| | | | | |
|---|---|---|---|---|
| 4,819,233 A * | 4/1989 | Delucia | ............... | G06F 11/3688 714/E11.209 |
| 6,522,995 B1 * | 2/2003 | Conti | ............... | G06F 11/3414 702/183 |
| 6,536,036 B1 * | 3/2003 | Pavela | ............... | 717/125 |
| 7,028,290 B2 | 4/2006 | Srivastava et al. | | |
| 7,047,463 B1 * | 5/2006 | Organ | ............... | G01R 31/2893 714/51 |
| 7,503,037 B2 | 3/2009 | Banerjee et al. | | |
| 7,552,361 B2 | 6/2009 | Galler et al. | | |
| 7,603,660 B2 | 10/2009 | Davia et al. | | |
| 7,747,987 B1 * | 6/2010 | Akarte et al. | ............... | 717/131 |
| 7,823,132 B2 * | 10/2010 | Ulrich | ............... | G06F 11/3672 714/38.1 |
| 7,873,944 B2 * | 1/2011 | Bangel | ............... | G06F 11/3664 717/124 |
| 7,958,400 B2 * | 6/2011 | Ur | ............... | G06F 11/3616 717/124 |
| 8,151,248 B1 * | 4/2012 | Butler | ............... | G06F 11/368 717/124 |
| 8,276,123 B1 * | 9/2012 | Deng | ............... | G06F 11/368 714/37 |
| 8,413,117 B1 * | 4/2013 | Coughlan | ............... | G06F 11/3688 714/36 |

(Continued)

OTHER PUBLICATIONS

U.S. Appl. No. 14/478,260, entitled "Prioritizing Test Cases Using Multiple Variables", filed Sep. 5, 2014.

(Continued)

*Primary Examiner* — Tuan Q. Dam
*Assistant Examiner* — Zheng Wei
(74) *Attorney, Agent, or Firm* — Isaac J. Gooshaw

(57) ABSTRACT

A computer identifies lines of code of a product program that have been modified after an initial test of the product program. The computer determines the overlap between lines of code that have been modified and a mapped test case. The computer determines a weighted value for the mapped test case based on two or more of, an environment of the test case, the degree of the overlap, a time the test case was last executed, a time the test case takes to execute, and a priority of a defect. The environment of the test case is configured to replicate a working environment where the product program is to be deployed and includes an operating system, a hardware configuration, and the configuration of the operating system.

12 Claims, 3 Drawing Sheets

(56) References Cited

U.S. PATENT DOCUMENTS

| | | | | |
|---|---|---|---|---|
| 8,539,282 | B1* | 9/2013 | Kabanov et al. | 714/38.1 |
| 8,561,024 | B2* | 10/2013 | Basler | G06F 8/20 717/124 |
| 8,627,287 | B2* | 1/2014 | Fanning | G06F 8/75 717/124 |
| 8,984,485 | B2* | 3/2015 | Elshishiny | G06F 11/3676 717/124 |
| 9,075,919 | B2* | 7/2015 | Sawano | G06F 11/3684 |
| 2003/0093716 | A1* | 5/2003 | Farchi et al. | 714/34 |
| 2005/0144593 | A1* | 6/2005 | Raghuvir et al. | 717/124 |
| 2005/0223357 | A1* | 10/2005 | Banerjee et al. | 717/120 |
| 2005/0223361 | A1* | 10/2005 | Belbute | G06F 11/3688 717/124 |
| 2006/0075302 | A1* | 4/2006 | Ulrich et al. | 714/38 |
| 2006/0075303 | A1* | 4/2006 | Ulrich | G06F 11/3672 714/38.14 |
| 2006/0174162 | A1* | 8/2006 | Varadarajan | G06F 11/263 714/38.14 |
| 2007/0136024 | A1* | 6/2007 | Moser | G06F 11/3688 702/119 |
| 2007/0240116 | A1* | 10/2007 | Bangel | G06F 11/3664 717/124 |
| 2008/0120601 | A1* | 5/2008 | Ashida et al. | 717/124 |
| 2009/0144698 | A1* | 6/2009 | Fanning | G06F 8/75 717/120 |
| 2009/0199045 | A1* | 8/2009 | Kasubuchi et al. | 714/38 |
| 2009/0265681 | A1 | 10/2009 | Beto et al. | |
| 2009/0265693 | A1* | 10/2009 | Bakowski | G60F 11/3688 717/131 |
| 2009/0265694 | A1* | 10/2009 | Bakowski | G06F 11/3676 717/131 |
| 2009/0307763 | A1* | 12/2009 | Rawlins | G06F 11/2294 726/5 |
| 2010/0058295 | A1* | 3/2010 | Johnson et al. | 717/124 |
| 2010/0100871 | A1* | 4/2010 | Celeskey | G06F 11/3688 717/124 |
| 2010/0146340 | A1 | 6/2010 | Bhate et al. | |
| 2011/0145788 | A1 | 6/2011 | Xu et al. | |
| 2012/0192153 | A1* | 7/2012 | Venkatraman et al. | 717/124 |
| 2013/0311977 | A1* | 11/2013 | Nieminen | G06F 11/3672 717/135 |
| 2014/0040867 | A1* | 2/2014 | Wefers et al. | 717/131 |
| 2014/0130017 | A1* | 5/2014 | Wang | G06F 11/3672 717/124 |
| 2014/0173555 | A1* | 6/2014 | Ng | G06F 8/30 717/109 |
| 2014/0245264 | A1* | 8/2014 | Bartley | G06F 8/70 717/124 |
| 2014/0325485 | A1* | 10/2014 | Sawano | G06F 11/3684 717/124 |
| 2014/0331203 | A1* | 11/2014 | Elshishiny | G06F 11/3676 717/124 |
| 2015/0007148 | A1* | 1/2015 | Bartley | G06F 8/70 717/131 |
| 2015/0178182 | A1* | 6/2015 | Mallya | G06F 11/3672 717/124 |
| 2015/0212932 | A1* | 7/2015 | Sawano | G06F 11/3684 717/124 |
| 2015/0220426 | A1* | 8/2015 | Spektor | G06F 11/36 717/131 |

OTHER PUBLICATIONS

Aggrawal, "Code Coverage Based Technique for Prioritizing Test Cases for RegressionTesting", ACM SIGSOFT Software Engineering Notes, Sep. 2004, vol. 29 No. 5, pp. 1-4.

IBM, "Using changes in code complexity metrics to prioritise test case running", Original Publication Date: Jul. 29, 2009, IP.com No. IPCOM000185626D, IP.com Electronic Publication: Jul. 29, 2009, pp. 1-2, <http://ip.com/IPCOM/000185626>.

Malhotra et al., "A Regression Test Selection and Prioritization Technique", Journal of Information Processing Systems, vol. 6, No. 2, Jun. 2010, Manuscript received Apr. 12, 2010; accepted May 11, 2010, Copyright 2010 KIPS (ISSN 1976-913X), pp. 235-252, doi: 10.3745/jips.2010.6.2.235.

Panigrahi et al., "Test Case Prioritization of Object-Oriented Programs", SETLabs Briefings, vol. 9 No. 4 2011, pp. 31-40, Copyright Infosys Limited, 2011, SetlabsBriefings@infosys.com.

Prakash et al., "Multiple Criteria Based Test Case Prioritization for Regression Testing", European Journal of Scientific Research, ISSN 1450-216X vol. 84 No. 1 (2012), pp. 36-45, Copyright EuroJournals Publishing, Inc. 2012, <http://www.europeanjournalofscientificresearch.com>.

Roongruangsuwan et al., "Test Case Prioritization Techniques", Journal of Theoretical and Applied Information Technology, Copyright 2005-2010 JATIT & LLS., pp. 45-60, <www.jatit.org>.

Disclosed Anonymously, "System and Method to Generate and Prioritize Test Cases", IP.com No. IPCOM000221075D, IP.com Electronic Publication: Aug. 28, 2012, pp. 1-10, <http://ip.com/IPCOM/000185626>.

"Test prioritization Tool", Feb. 22, 2013, Copyright 1996-2011, Intel Corporation, <http://software.intel.com/sites/products/documentation/hpc/composerxe/en-us/2011Update/fortran/win/optaps/common/optaps_pgo_prior.htm>.

* cited by examiner

US 9,311,223 B2

PRIORITIZING TEST CASES USING MULTIPLE VARIABLES

FIELD OF THE INVENTION

The present invention relates generally to the field of program development, and more particularly to program testing using test cases.

BACKGROUND OF THE INVENTION

The development of new programs for computing devices can be an extensive, time consuming, and tedious process that requires thousands of personnel-hours and thousands of machine-hours. Typically, a program is developed piecemeal by a group of developers. Once the program has been developed, the entire program is submitted to a group of testers for testing. In general, as the size of the programming code increases, so does the personnel-hour and machine-hour requirements for testing. For example, a large program may require over five hundred developers writing upwards of thirty million lines of code. In order to adequately test such a large program, over one thousand testers may be required to write the tens of thousands of tests needed to test that program. Therefore, testing a large program can take over one thousand machine hours to complete.

Through program testing, program developers are often able to identify problems that need correction before a program is released, implemented, or updated. A testing phase often includes testing multiple scenarios referred to as test cases that involve certain lines of the program code. During the development process, the lines of code of a program are often modified. When modifications are made to the program, the entire program is typically re-submitted for testing even if the modification made to the program was very small. This may require all the previously run tests to be executed again, even on portions of the program that have not been changed.

During a typical testing phase, test cases are run and analyzed to identify whether the program code is operating as intended. Though testing program code in this manner is typically effective to test a given program, there exist certain complications. For example, a program testing phase may include thousands of test cases and millions of lines of code. Running and analyzing each test case can take considerable time given the shear volume of test cases and code involved. This type of complication is often compounded as a program development cycle can include multiple program testing phases. In general, a lengthy program testing phase(s) can decrease efficiency, increase costs, and reduces the overall benefit of a program development cycle.

SUMMARY

Embodiments of the present invention disclose a method, computer program product, and system for prioritizing test cases for program testing. A computer identifies lines of code of a product program that have been modified after an initial test of the product program. The computer determines the overlap between lines of code that have been modified and a mapped test case. The computer determines a weighted value for the mapped test case based on two or more of, an environment of the test case, the degree of the overlap, a time the test case was last executed, a time the test case takes to execute, and a priority of a defect. The environment of the test case is configured to replicate a working environment where the product program is to be deployed and includes an operating system, a hardware configuration, and the configuration of the operating system.

DETAILED DESCRIPTION

Figure 1:
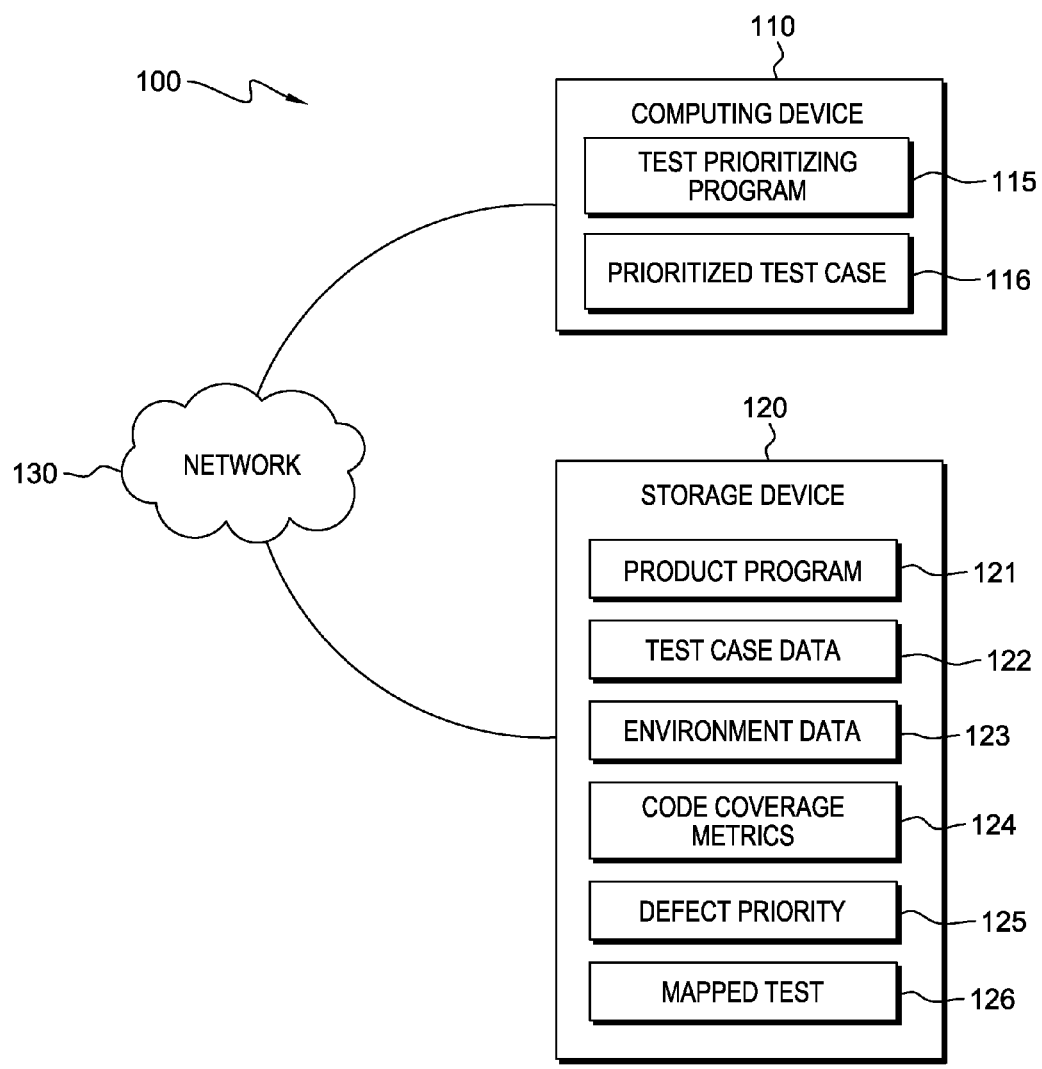
FIG. 1 is a functional block diagram illustrating a program development environment, in accordance with an exemplary embodiment.

The testing of programs ensures that the program has been implemented correctly and performs according to specifications. Testing new versions of a previously tested program helps to ensure that any newly added or revised code has not adversely affected any previously working features of the program. Since defect detection and correction is more costly to fix after the program has been released, a common goal of program testing is to identify program defects prior to releasing the program to consumers.

Generally, testing of a program occurs continuously throughout the program development process. For example, developers may run some preliminary tests to determine whether new or modified code will prevent the program from being built (compiled and linked). Such tests may involve compiling the code to determine whether any program defects, such as the misspelling of a variable name or a syntactical error, will prevent compilation or whether the program fails to link correctly due to invalid modules.

After a program is built, verification tests are often run before the program is released for full testing. Verification tests are not intended to be exhaustive and often must be completed within a limited time. Full testing is intended to be exhaustive and may be very time consuming. For example, full testing may take days or weeks to run. It is advantageous to detect defects as early as possible, e.g., on day 1 rather than day 21, because early defect detection enables developers to start fixing defect sooner.

Typically, there are three common approaches used for addressing the cost of program testing in terms of time, manpower and computing resources. The first approach is test elimination. Test elimination involves test selection and minimization to reduce the number of tests that are executed. The second approach is referred to as test prioritization. Test prioritization schedules tests in a priority order based on variables such as coverage of branches and statements of the source code and the probability of exposing faults. The third approach is a hybrid approach that combines the two previous techniques by starting first with test elimination using source code changes followed by test prioritization to schedule the selected tests.

A number of studies have been conducted to measure the effectiveness of various test selection techniques. These techniques used source code differencing, data flow analysis, and differences in procedure level entities to identify which parts of the program might be affected by the changes. Data flow analysis is difficult in a programming language such as C++ or C which contains pointers, casts, and aliasing. Data flow analysis is not only expensive, but often does not scale to large commercial programs.

As test elimination techniques remove certain tests, their accuracy must be considered. Although some studies show in certain cases that there is no reduction in fault detection, other studies have shown that fault detection can be severely compromised due to inaccuracies in test elimination. While some test elimination techniques can be guaranteed safe under certain conditions, these conditions do not always occur.

Another major limitation of test elimination techniques is their inability to be effective when a procedure common to all tests is modified. For example, if the "main" procedure of a program is changed in a program written in C language, no tests will be eliminated. This is true because all tests cause the main procedure to be executed. Therefore, changes in the main procedure will require all tests to be re-run.

Generally, unit testing is loosely defined as the process of testing portions of the code that comprises a program. Unit testing often uses a set of test cases. A set of test cases is one or more test cases that are designed to cause a portion of the program code to execute or a particular function of the program code to occur. Typically, unit testing and the test cases are deemed to be of good quality if the unit testing covers most of the program code. A portion of the program code is considered to be covered if that given portion of program code is executed or a particular function of the program code occurs during the unit testing. Code coverage is a measurement, often a percentage, which indicates how much of the program code has been executed using a given set of test cases.

Often, the higher the code coverage percentage, the more likely it is that a defect (a program bug or error) in the code will be identified during the unit testing. Consequently, a higher code coverage percentage for a given test case indicates a higher quality analysis for the tested code. For example, there is a limited amount of time to test the code for a new program and the program code includes one hundred lines of code. If two lines of code are executed by a first test case, then the code coverage percentage would be two percent for that test case. If a second test case executes twenty three lines of code, then the code coverage value would be twenty three percent, indicating that the second test case could be of much higher value when testing the code. Therefore, the second test case would be preferably used to test the new program.

If only a portion of the program code is to be tested, then code coverage values can fail to indicate whether the changed portion of the code has been covered. Continuing with the above example, if two lines of the program code were changed out of one hundred lines of code, then the code coverage value of two percent could leave a program developer wondering if the two lines that were executed were the lines of code that were changed or if the executed lines of code were two lines of code that had not been changed.

Developers often build and test enhancements, modifications, or other changes to code in a sandbox build. In programming context, a sandbox is a development area of a data processing system where developers incrementally build and test code. A sandbox build is a collection, or build, of code that is to be tested in a sandbox. A backing build is a collection, or build, of original program code, from which the incremental changes of the sandbox build are made.

Code coverage information is often based on the presumption that the entire code of a sandbox build has to be traversed and the code coverage percentage is generated relative to the entire sandbox build code. In other instances, code coverage information is generated by comparing the code coverage of the sandbox build to a previously computed code coverage of a backing build. However, running test cases on a backing build to generate code coverage information can be both expensive and time consuming. Therefore, information that is specific to the changed or designated code potions is not always available. In still other instances, code coverage information can be generated by comparing different test runs. However, such a comparison typically requires a prior computation of code coverage of the backing build to provide changed code specific code coverage information.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a program development environment, generally designated 100, in accordance with an exemplary embodiment. Program development environment 100 includes computing device 110 and storage device 120 connected via network 130.

In exemplary embodiments, computing device 110 includes test prioritizing program 115 and prioritized test case 116. Storage device 120 includes product program 121, test case data 122, environment data 123, code coverage metrics 124, defect priority 125, and mapped test 126.

In various embodiments of the present invention, computing device 110 is computing device that can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to test prioritizing program 115 and prioritized test case 116, and is capable of running test prioritizing program 115. Computing device 110 may include internal and external hardware components, as depicted and described in further detail with respect to FIG. 3.

In exemplary embodiments, test prioritizing program 115, and prioritized test case 116 are stored on computing device 110. However, in other embodiments, test prioritizing program 115, and prioritized test case 116 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110, test prioritizing program 115, prioritized test case 116, and storage device 120 in accordance with an exemplary embodiment of the present invention.

In exemplary embodiments, test prioritizing program 115 determines a weighted value for each test case included in a set of test cases. The test cases are ranked by test prioritizing program 115 based on the weighted value associated with each test case. The weighted value of a given test case is based on several factors including the environment of the test case, the degree of overlap between the test case and the program under development, the last time the test case was executed, the amount of time the test case takes to execute, and the priority of a defect identified in the program under development. In an exemplary embodiment, a weighted value is assigned to a test case after the test case has been mapped. See the discussion of mapped test 126 for further details regarding the process of mapping a test case.

In an exemplary embodiment, prioritized test case 116 includes the weighted values of test cases and prioritized lists of test cases that are produced by test prioritizing program 115. Prioritized test case 116 is continuously updated as test prioritizing program 115 determines weighted values for test cases and generates prioritized lists of test cases.

In exemplary embodiments, by analyzing the information included in prioritized test case 116, a determination can be made regarding which test cases to apply during the testing of a program under development. In some embodiments, the determination as to which test cases to apply during the testing of a program under development is made by test prioritizing program 115 or another program operating on a computing device. In other embodiments, the determination as to which test cases to apply during the testing of a program under development is made by an individual, such as a program developer.

In various embodiments of the present invention, storage device 120 is a data storage device in communication with computing device 110. Storage device 120 stores the information included in product program 121, test case data 122, environment data 123, code coverage metrics 124, defect priority 125, and mapped test 126. Typically, this information is accessed as needed by computing device 110 via network 130. In some embodiments, storage device 120 is integral with computing device 110. In some embodiments of the present invention, storage device 120 is computing device that can be a standalone device, a server, a laptop computer, a tablet computer, a netbook computer, a personal computer (PC), or a desktop computer. In another embodiment, storage device 120 represents a computing system utilizing clustered computers and components to act as a single pool of seamless resources. In general, storage device 120 can be any computing device or a combination of devices with access to product program 121, test case data 122, environment data 123, code coverage metrics 124, defect priority 125, and mapped test 126, and is capable of communicating with computing device 110 via network 130. Storage device 120 may include internal and external hardware components, as depicted and described in further detail with respect to FIG. 3.

In an exemplary embodiment, product program 121 is a file containing a program that is under development, i.e., a program to be tested. Product program 121 also includes updates, e.g., updated lines of code, for the program or various versions of the program.

In an exemplary embodiment, test case data 122 is a file containing a number of test cases along with the data associated with each test case. The data associated with each test case includes information such as when the test case was last run, how long the test case has previously taken or should take to run, which version of the program to be tested was used during the test, as well as the code coverage associated with the test case and the program to be tested. Test case data 122 also includes updated versions of the test cases. Often, the time the test case was last executed and the time the test case takes to execute are both determined respective to the environment where the program under development, included in product program 121, is to be deployed.

In an exemplary embodiment, environment data 123 includes information relating to the environment in which a test case, included in test case data 122, is run. The environment of the test case is typically tailored to substantially mimic or replicate the working environment where the program under development is to be deployed. Environment data 123 includes information such as the operating system, hardware configuration, and the configuration of the operating system within the working environment where the program under development is to be deployed. The information included in environment data 123 is used to replicate an environment, for example, a smartphone, a laptop, a PC or a server, where the program under development is to be deployed.

In an exemplary embodiment, code coverage metrics 124, includes a list of rules that are applied when determining the degree of code coverage for a given test case. The code coverage metrics include rules that indicate the degree to which the source code of a program under development has been tested in a previous test run, i.e., how much of the source code was tested. The code coverage metrics also include rules that indicate which source code files have been tested, e.g., the names of the product program tested. The code coverage metrics also include rules that indicate which lines in the source code file, e.g., the product program, have been tested. Typically, these rules are tailored for a program under development and an environment in which the test case is to be run. The rules included in code coverage metrics 124 can also include rules such as test elimination rules and test prioritization rules that are adapted for a specific test or group of tests.

In an exemplary embodiment, defect priority 125 includes the rules that are used by test prioritizing program 115 to determine the priority that should be assigned to a given code change. The priority assigned to a code change reflects the severity of a program defect, i.e., an error or fault, which results from the change. The priority is based on an evaluation of the degree of impact that the given defect has had on the development or operation of a system that includes the program under development. For example, if the program under development interacts with several other programs and hardware that comprise a computing system. The priority of a given defect is often used to determine whether or when the defect will be corrected. Therefore, the higher the defect priority, i.e., the defect severity, the more important it can be to address that defect. In an exemplary embodiment, the rules included in defect priority 125 can be used by test prioritizing program 115 to identify which lines of code of a product program that have been modified based. For example, test prioritizing program 115 uses the rules in defect priority 125 to identify which types of code changes have the highest priority defect. Based on the types of code changes have the highest priority defect, test prioritizing program 115 can then search the code of a program under development for code changes that match the type of code changes have the highest priority defect.

In an exemplary embodiment, mapped test 126 includes detailed code coverage metrics, i.e., information regarding the code coverage, that are generated using the environment of the test case included in environment data 123, and code coverage metrics included in code coverage metrics 124. The detailed code coverage metrics included in mapped test 126 are typically only applicable to the test used to create them. In other words, the detailed code coverage metrics are usually specific to a select test case and environment. To generate detailed code coverage information, a test run is executed using the test case, the environment of the program under development, and an initial version of the program under development included in product program 121. The resulting detailed code coverage gathered during the test, i.e., the code that was executed by the test case, is then stored as part of mapped test 126. Other information gathered regarding the test is stored in an appropriate file. For example, the time and date the test was executed, and the time it took to finish executing would be stored as part of test case data 122.

Figure 2:
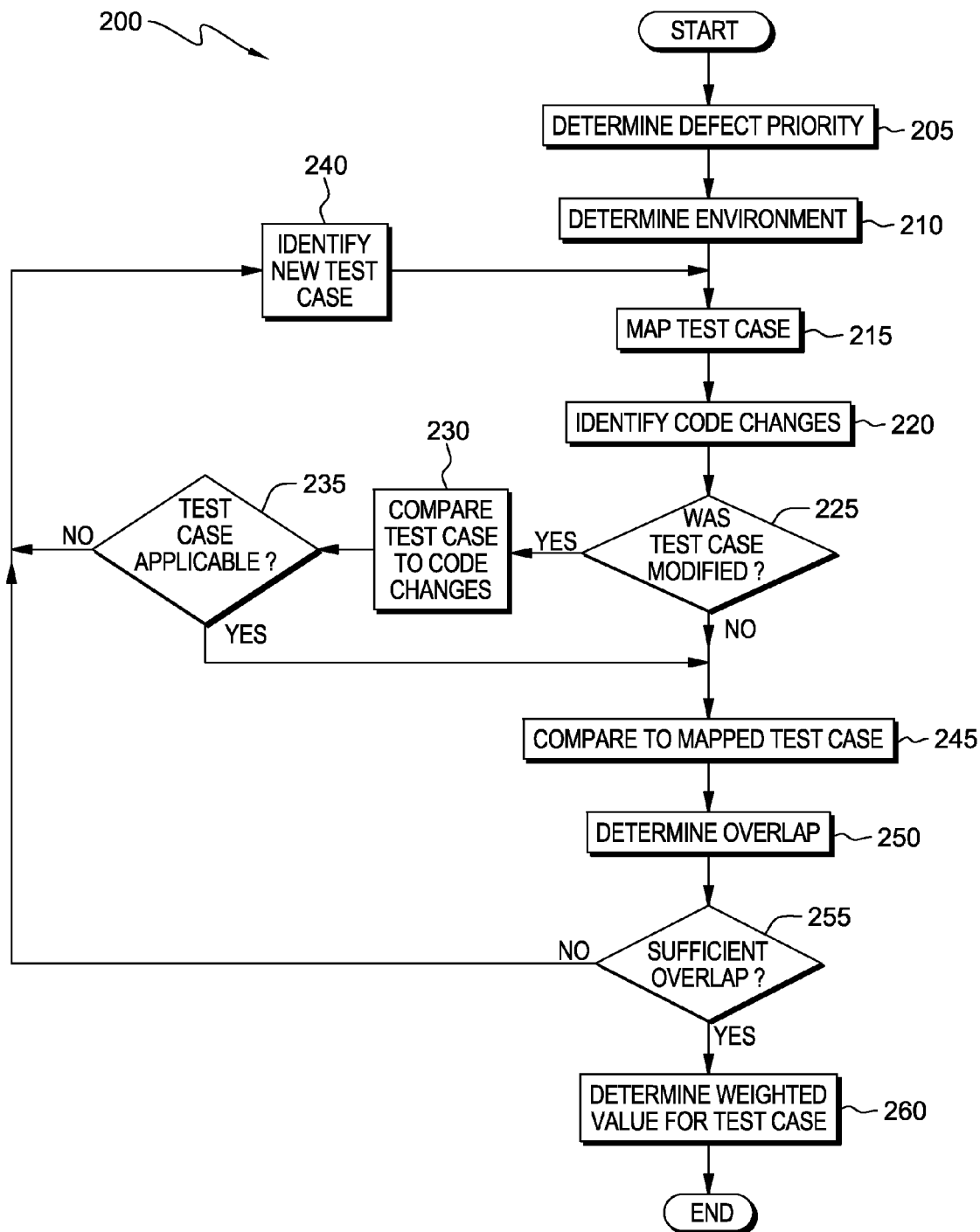
FIG. 2 illustrates the operational steps of a test case prioritizing program, on a computing device within the program development environment of FIG. 1, in accordance with an exemplary embodiment.

FIG. 2 is a flow chart, 200, illustrating the operational steps of test prioritizing program 115 executing on computing device 110, in accordance with an exemplary embodiment.

In an exemplary embodiment, test prioritizing program 115 determines the defect priority for a defect that was identified in the program under development, in step 205. To determine the defect priority for a defect, test prioritizing program 115 accesses the program code of the program under development, which is included in product program 121, and identifies the type of code change that has been made to the program under development. Test prioritizing program 115 matches the type of code change to a list of defect priorities included in defect priority 125 and identifies the defect priority value of the change made to the program under development. For example, test prioritizing program 115 identifies the type of change as a change to a method of the program under development. Test prioritizing program 115 accesses defect priority 125 and identifies the defect priority value for changes that are made to a method of the program under development. Test prioritizing program 115 then associates the identified defect priority value to the code change. In another example, test prioritizing program 115 uses the rules in defect priority 125 to identify which types of code changes have the highest priority defect. Based on the types of code changes have the highest priority defect, test prioritizing program 115 then searches the code of the program under development for code changes that match the type of code changes have the highest priority defect. After identifying the matching code changes, test prioritizing program 115 associates the identified defect priority value to the respective identified code change.

In an exemplary embodiment, test prioritizing program 115 determines the environment in which the program under development will be deployed, in step 210. Test prioritizing program 115 queries environment data 123 for information regarding the deployment environment of the program under development, which should be substantially mirrored in the testing and development environment. Test prioritizing program 115 then flags the identified environment information, regarding the environment of the program under development, for retrieval during the mapping of the test case.

In an exemplary embodiment, in step 215, test prioritizing program 115 maps the test case using the identified environment information included in environment data 123, and the code coverage metrics included in code coverage metrics 124. Test prioritizing program 115 retrieves the flagged environment information, the code coverage metrics, and the test case information included in test case data 122. Using the flagged environment information, the code coverage metrics, and the test case information, test prioritizing program 115 generates detailed code coverage information for the test case. Test prioritizing program 115 saves the code coverage information for the test run, and the test run information, including a time stamp indicating the time and date the test was executed, as part of mapped test 126. For example, test prioritizing program 115 executes a test run using the test case, the identified deployment environment information, and an initial version of the program under development included in product program 121. Test prioritizing program 115 applies a code coverage metric, e.g., a rule, that determines the detailed code coverage as a quantity. That quantity is based on the amount of code, of the program under development, that is executed by the test case. The more code that is executed by the test case, the higher the detailed code coverage quantity is determined to be. Based on the results of the test run, test prioritizing program 115 determines that the detailed code coverage for the test case is twenty eight percent, i.e., twenty eight percent of the code of the program under development is executed by the test case. Test prioritizing program 115 saves the detailed code coverage for the test case information and the test run information as part of mapped test 126.

In an exemplary embodiment, in step 220 test prioritizing program 115 identifies and flags all of the code changes, i.e., updates that have been made to the test case using the information included in test case data 122. To identify the code changes that have been made to a test case, test prioritizing program 115 accesses test case data 122 and identifies the code changes that were made to the code of the test case. Code changes are identified by test prioritizing program 115 via the identification of a time stamp, which is associated with every code change made to the test case. Test prioritizing program 115 compares the time stamp of the code changes to the time stamp associated with the test run included in mapped test 126. If a code change occurred after the time stamp of the test run, then test prioritizing program 115 identifies and flags that code change as a code change that has been made to the test case. For example, a code change was made to the test case six hours after the detailed code coverage for a test case was generated. Test prioritizing program 115 therefore identifies and flags the code changes that were made to the test case, flags the test case as changed, and saves the result as part of test case data 122.

In an exemplary embodiment, in decision step 225, test prioritizing program 115 determines if the test case was modified, i.e., whether or not any code changes were made to the test case after the time stamp of the test run. If a change has been made to the test case before the timestamp of the test run then that change was already accounted for when the test case was mapped. If a change was made to the test case after the test case was mapped then that change may have affected the code coverage of the test case. Therefore, it may be important to identify any changes that were made after the timestamp of the test case. Test prioritizing program 115 queries test case data 122 for flags associated with the test case. If a flag is not identified (decision step 225, no branch), then test prioritizing program 115 proceeds to step 245. If a flag is identified (decision step 225, yes branch), then test prioritizing program 115 compares the code changes made to the test to the code changes made to the program under development, in step 230.

In an exemplary embodiment, in step 230, if test prioritizing program 115 identifies a code change made to the test case that affects lines of code that were changed in the program under development, then test prioritizing program 115 flags the changes accordingly and saves this information as part of test case data 122. For example, the test case has a code change to code lines 50-100 and those lines affect the function of code lines 28-45 of the program under development. If a change has been made to any of the code lines 28-45 of the program under development, then the detailed code coverage should be re-computed to validate the test case code coverage of code lines 28-45. Test prioritizing program 115 flags the changes made to the test case based on whether those changes affect the lines of code that were changed in the program under development, and saves this information as part of test case data 122.

In an exemplary embodiment, test prioritizing program 115 determines if the test case is applicable for the testing of the program under development, in decision step 235. Test prioritizing program 115 queries test data 122 and identifies any flags that indicate change(s) were made to the test case that affect lines of code that were changed in the program under development. If test prioritizing program 115 identifies one or more flag(s) that indicate change(s) were made to the test case that affect lines of code that were changed in the program under development, then test prioritizing program 115 determines that the test case is not applicable (decision step 235, no branch) and proceeds to step 240.

In an exemplary embodiment, in step 240 test prioritizing program 115 identifies a new test case to be evaluated, i.e., the next potential test case that may be applicable for the testing of the program under development. Test prioritizing program 115 accesses test case data 122 and identifies a potential test case that does not have an associated weighted value for the program under development. For example, test case data 122 has a list of five thousand test cases but only five hundred have been identified potential test cases for the program under development. Test prioritizing program 115 accesses the list of test cases included in test case data 122, identifies the five hundred potential test cases, and selects, for processing, a test case that does not have an associated weighted value for the program under development.

In an exemplary embodiment, if test prioritizing program 115 does not identify any flags that indicate change(s) were made to the test case that affect lines of code that were changed in the program under development (decision step 235, yes branch), i.e., the test case is applicable, then test prioritizing program 115 proceeds to step 245.

In an exemplary embodiment, in step 245, test prioritizing program 115 compares the program under development to the mapped test case. Then, in step 250, test prioritizing program 115 determines the degree of overlap between the lines of code that have been changed in the program under development and the mapped test case. The degree of overlap between the lines of code that have been changed in the program under development and the mapped test case indicates the relative effectiveness or benefit that execution of the test case may provide regarding the testing of the program under development. In other words, the degree of overlap indicates how useful the mapped test case will be in terms of testing the program under development. The degree of overlap between the lines of code that have been changed in the program under development and the mapped test case is based, at least in part, on the defect priority of the defect, which was determined in step 205. A low defect priority indicates that the change in the code is minor. A minor change to the code is rarely the root cause of an error. Therefore, code changes with high defect priorities are weighted more heavily when determining the degree of overlap between the lines of code that have been changed in the program under development and the mapped test case. For example, a code change has a priority defect of 9.5 on a scale of 10. Therefore, a test case which covers that change would be very beneficial to the testing of the program under development. Conversely, another code change has a priority defect of 2 on a scale of 10. Therefore, a test case which covers that code change would likely be of limited benefit to the testing of the program under development.

In an exemplary embodiment, in decision step 255, test prioritizing program 115 determines if there is sufficient overlap between the program under development to the mapped test case. In general, the required degree of overlap is a preset value, but this value can be modified as needed by a program developer. In many instances, a higher degree of overlap is far preferable to a lower degree of overlap. If there is not sufficient overlap between the program under development to the mapped test case (decision step 255, no branch), then test prioritizing program 115 proceeds to step 240. If there is sufficient overlap between the program under development to the mapped test case (decision step 255, yes branch), then test prioritizing program 115 proceed to step 260.

In an exemplary embodiment, in step 260, test prioritizing program 115 determines the weighted value for the mapped test case and generates the weighted list of test cases once a sufficient number of test cases have been identified. The weighted value for a given mapped test case takes into account a number of various factors such as the environment of the test case, the degree of overlap, the time the test case was last executed, the time the test case takes to execute, and the priority of the defect identified in the program under development.

In an exemplary embodiment, the weighted value indicates the level of benefit that execution of the test case will provide regarding the testing of the program under development. By organizing the test cases in a list by descending weighted value the most beneficial test cases can be identified and used to test the program under development. For example, based on time constraints, only the top ten test cases on the list are used to test the program under development. By not using the less beneficial test cases the program developer is able to meet the time deadline while testing the program under development.

In an exemplary embodiment, each factor is assigned a value and the weighted value is a sum of the assigned values of each factor. In other embodiments, the technique used to calculate the weighted value can include the application of statistical analysis. In some embodiments a combination of techniques can used to compute the weighted value of a test case, e.g., weighted values are combined with statistical analysis.

Figure 3:
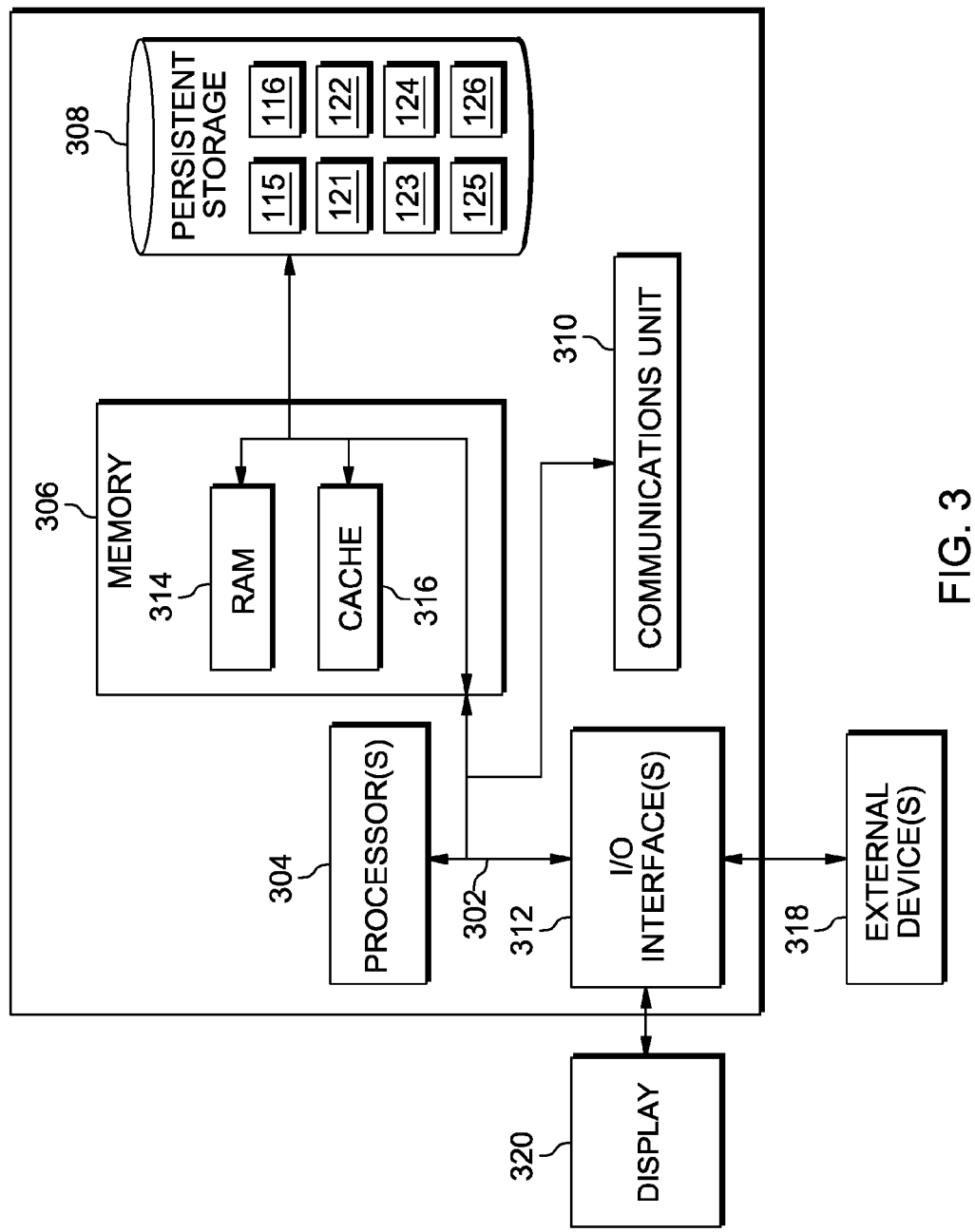
FIG. 3 depicts a block diagram of components of the computing device executing the test case prioritizing program, in accordance with an exemplary embodiment.

FIG. 3 depicts a block diagram of components of computing device 110, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Test prioritizing program 115, prioritized test case 116, product program 121, test case data 122, environment data 123, code coverage metrics 124, defect priority 125, and mapped test 126 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of storage device 120. In these examples, communications unit 310 includes one or more network interface cards. Communications unit 310 may provide communications through the use of either or both physical and wireless communications links. Test prioritizing program 115, prioritized test case 116, product program 121, test case data 122, environment data 123, code coverage metrics 124, defect priority 125, and mapped test 126 may be downloaded to persistent storage 308 through communications unit 310.

I/O interface(s) 312 allows for input and output of data with other devices that may be connected to computing device 110. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., test prioritizing program 115, prioritized test case 116, product program 121, test case data 122, environment data 123, code coverage metrics 124, defect priority 125, and mapped test 126, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for prioritizing test cases for program testing based on a weighted value, the computer program product comprising:
    one or more computer-readable storage media and program instructions stored on the one or more computer-readable storage media, the program instructions comprising:
        program instructions to identify lines of code of a product program that have been modified after an initial test of the product program using a mapped test case;
        program instructions to determine whether code of the mapped test case was modified after a time stamp of the initial test for the product program;
        program instructions to determine whether the modified test case is applicable by comparing the modified test case and the identified lines of code of the product program that have been modified;
        program instructions to determine an amount of lines of code of the product program that a) have been modified and b) are testable by the mapped test case, wherein the mapped test case is mapped to lines of code of the program product based on at least one of i) an environment of the mapped test case and ii) code coverage metrics that determine code coverage based, at least in part, on the amount of code of the program product that is executed by the mapped test case, and wherein the environment of the test case is configured to replicate, at least in part, a working environment where the product program is to be deployed and includes one or more of an operating system, a hardware configuration, and a configuration of the operating system; and
        program instructions to determine the weighted value for the mapped test case based on the environment of the mapped test case and one or more of the an amount of lines of code of the product program that a) have been modified and b) are testable by the mapped test case, a time the mapped test case was last executed, a time required to execute the mapped test case, and a priority of a defect.

2. The computer program product of claim 1, the program instructions further including:
    program instructions to generate code coverage metrics for a test case in the environment of the test case, the code coverage metrics indicating one or more of the degree to which a source code of a program has been tested, which source code files have been tested, and which lines in the source code file have been tested.

3. The computer program product of claim 2, wherein the program instructions to generate code coverage metrics includes:
    program instructions to generate the mapped test case by executing the test case using a production code in the environment of the test case;
    program instructions to determine the time required to execute the test case; and
    program instructions to generate code coverage metrics based, at least in part, on the time required to execute the test case and on the degree of code coverage between the production code and the test case.

4. The computer program product of claim 1, wherein one or both of the time the test case was last executed and the time required to execute the test case are determined respective to the environment of the test case.

5. The computer program product of claim 1, wherein the priority of the defect is based, at least in part, on a degree of impact a program bug has on a development or operation of a system that includes the product program.

6. The computer program product of claim 1, wherein the program instructions to determine an amount of lines of code of the product program that a) have been modified and b) are testable by a mapped test case includes:
    program instructions to identify lines of code included in a product program that have been modified based, at least in part, on the priority of the defect.

7. A computer system for prioritizing test cases for program testing based on a weighted value, the computer system comprising:
    one or more computer processors;
    one or more computer readable storage medium;
    program instructions stored on the computer readable storage medium for execution by at least one of the one or more processors, the program instructions comprising:
        program instructions to identify lines of code of a product program that have been modified after an initial test of the product program using a mapped test case;
        program instructions to determine whether code of the mapped test case was modified after a time stamp of the initial test for the product program;
        program instructions to determine whether the modified test case is applicable by comparing the modified test case and the identified lines of code of the product program that have been modified;
        program instructions to determine an amount of lines of code of the product program that a) have been modified and b) are testable by the mapped test case, wherein the mapped test case is mapped to lines of code of the program product based on at least one of i) an environment of the mapped test case and ii) code coverage metrics that determine code coverage based, at least in part, on the amount of code of the program product that is executed by the mapped test case, and wherein the environment of the test case is configured to replicate, at least in part, a working environment where the product program is to be deployed and includes one or more of an operating system, a hardware configuration, and a configuration of the operating system; and program instructions to determine the weighted value for the mapped test case based on the environment of the mapped test case and one or more of the an amount of lines of code of the product program that a) have been modified and b) are testable by the mapped test case, a time the mapped test case was last executed, a time required to execute the mapped test case, and a priority of a defect.

8. The computer system of claim 7, the program instructions further including:

program instructions to generate code coverage metrics for the test case in the environment of the test case, the code coverage metrics indicating one or more of the degree to which a source code of a program has been tested, which source code files have been tested, and which lines in the source code file have been tested.

9. The computer system of claim 8, wherein the program instructions to generate code coverage metrics includes:

program instructions to generate the mapped test case by executing the test case using a production code in the environment of the test case;

program instructions to determine the time required to execute the test case; and program instructions to generate code coverage metrics based, at least in part, on the time required to execute the test case and on the degree of code coverage between the production code and the test case.

10. The computer system of claim 7, wherein one or both of the time the test case was last executed and the time required to execute the test case are determined respective to the environment of the test case.

11. The computer system of claim 7, wherein the priority of the defect is based, at least in part, on a degree of impact a program bug has on a development or operation of a system that includes the product program.

12. The computer system of claim 7, wherein the program instructions to determine an amount of lines of code of the product program that a) have been modified and b) are testable by a mapped test case includes:

program instructions to identify lines of code included in a product program that have been modified based, at least in part, on the priority of the defect.

* * * * *